United States Patent [19]

Hufnagel et al.

[11] Patent Number: 4,625,372
[45] Date of Patent: Dec. 2, 1986

[54] APPARATUS FOR THE MANUFACTURE OF BIAXIALLY STRETCHED FLAT FILM

[75] Inventors: Walter Hufnagel, Forchheim; Volker Graap, deceased, late of Burk, by Erika Graap geborene Lang, executrix; Freidrich von und zu Aufsess, Forchheim/Reuth; Rötger Armsen, Buckenhofen, all of Fed. Rep. of Germany

[73] Assignee: Internationale Octrooi Maatschappij "Octropa" B.V., Rotterdam, Netherlands

[21] Appl. No.: 714,792

[22] Filed: Mar. 22, 1985

Related U.S. Application Data

[60] Continuation of Ser. No. 166,514, Jul. 7, 1980, abandoned, which is a division of Ser. No. 964,002, Nov. 27, 1978, Pat. No. 4,261,944, which is a continuation-in-part of Ser. No. 887,582, Mar. 17, 1978, abandoned, which is a continuation of Ser. No. 699,684, Jun. 25, 1976, abandoned.

[30] Foreign Application Priority Data

Jun. 25, 1975 [DE] Fed. Rep. of Germany ....... 2528370

[51] Int. Cl.$^4$ .............................................. B29C 55/00
[52] U.S. Cl. ..................................... 26/73; 264/290.2
[58] Field of Search .................. 264/175, 235.8, 290.2, 264/DIG. 73; 26/52, 72, 73

[56] References Cited

U.S. PATENT DOCUMENTS 3,046,599 7/1962 Nicholas et al. .................. 264/290.2
3,172,150 3/1965 Donier ..................................... 26/72
3,890,421 6/1975 Habozit ........................ 264/DIG. 73

FOREIGN PATENT DOCUMENTS 671029 9/1963 Canada .............................. 264/290.2
25680 3/1975 Japan ................................. 264/289,9

OTHER PUBLICATIONS

"Biaxial Stretching of Polypropylene Film, Jock, British Plastics, Jul. 1961, pp. 391-394.

Primary Examiner—James Lowe
Attorney, Agent, or Firm—Cushman, Darby & Cushman

[57] ABSTRACT

An apparatus is disclosed for the fabrication of a biaxially stretched flat film of thermoplastic material, particularly of polypropylene, with improved properties for a process in which the material is first partially pre-stretched in a longitudinal direction and, thereafter, simultaneously biaxially (longitudinally and laterally) stretched, the apparatus comprising stretching rollers for effecting partial longitudinal stretching of the film, the rollers being arranged upstream of an assembly for effecting simultaneous biaxial stretching of the film. The speed of the stretching rollers is infinitely variable so as to influence the total degree of film-stretching only by changing the speed of the rollers. The rollers used for longitudinal pre-stretching are arranged at the inlet section of the biaxial stretching assembly. A system is provided to maintain the fiml exactly at the temperature required by the film characteristics for stretching, and biaxial stretching is done such tht any given point on the film in the region the film is being biaxially streched undergoes simultaneous biaxial stretching both in the longitudinal and transverse direction of the film.

2 Claims, 3 Drawing Figures

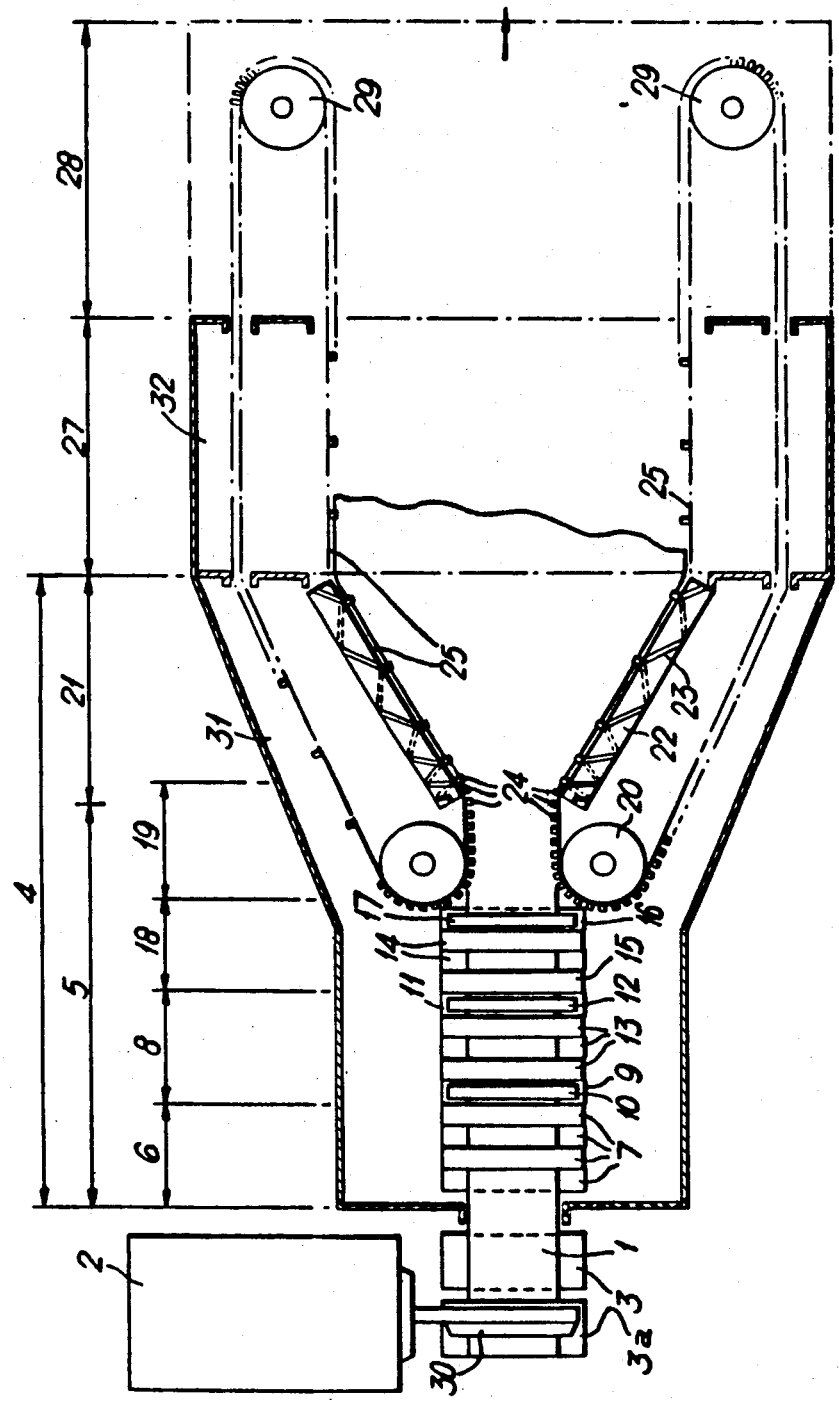

APPARATUS FOR THE MANUFACTURE OF BIAXIALLY STRETCHED FLAT FILM

RELATED APPLICATIONS

This is a continuation of application Ser. No. 166,514, filed July 7, 1980, now abandoned, which is a divisional of application Ser. No. 964,002, filed Nov. 27, 1978, now U.S. Pat. No. 4,261,944, which is a continuation-in-part of Ser. No. 887,582, filed Mar. 17, 1978, now abandoned, which is a continuation of Ser. No. 699,684, filed June 25, 1976, now abandoned.

BACKGROUND OF THE INVENTION

The invention relates to a method and apparatus for the fabrication of a biaxially stretched flat film generally from thermo-plastic materials such as polyolefins, and particularly from polypropylene. More particularly, the invention can be used as a process for improving the properties of a film of thermoplastic material by generally stretching a flat film of such material in two directions, and particularly by heating the film to an elevated temperature below its melting point (in a range, for example, of 50° C. to 170° C.), stretching the film first partially in its longitudinal direction, thereafter, at the same elevated temperature, stretching the film simultaneously in both directions (longitudinally and transversely), thereby simultaneously reaching the remainder of the stretching capacity of the film in the longitudinal direction and its total stretching capacity in the transverse direction, and cooling the stretched film to freeze (or make permanent) the film's orientation produced by stretching. The partial stretching in the first step in the longitudinal direction is preferably 25% to 50% of the total stretching capacity of the film in the longitudinal direction.

It is common practice in manufacturing biaxially stretched films to stretch the film first in one step in a device containing rollers arranged in a series in the longitudinal direction and then in another step to stretch the film in the transverse direction whereby the edges of the flat film are engaged by gripping means which are moved in a diverging relationship (e.g. as disclosed in U.S. Pat. No. 2,702,406 to E. G. Reed). However, particularly in the case of crystalline thermoplastic materials, such as, e.g. polyolefins, stretching in the longitudinal direction cannot be effected up to the optimum longitudinal stretching capacity of the finished film because the film obtained after the longitudinal stretching operation has such a great tendency to split that it cannot thereafter be stretched in the transverse direction. In the case of polypropylene films equal and maximum physical properties are achieved in both directions (longitudinally and transversely) if the stretching ratio in each of the directions is approximately 1:7, in other words, 1:7 in the longitudinal direction and 1:7 in the transverse direction, thereby resulting in an increase of approximately 49 times of the original or unstretched film area. Sometimes polypropylene films, for a given use they are to be applied to, are required to have a stretching ratio in longitudinal direction of up to 1:11, the total amount of stretching of the overall area of the film being about 1:50, the stretching ratio in the transverse direction, therefore, being 1:50/11.

Accordingly, for the purposes herein, when referring to "stretching ratios", we can refer to one which is "unidirectional"—namely, either longitudinal or transverse, or we can refer to one that is "bidirectional"—namely, one that is the mathematical product of the amount of stretch in the longitudinal and transverse directions.

Other biaxially stretched films are entirely simultaneously stretched in the longitudinal and transverse directions. In such operations, flat films are laterally constrained and guided by means of various gripping devices. An increase of stretching in the longitudinal direction leads to an increase in the spacing between the gripping devices, between which devices the film will show a severe deformation in the form of a "neck-in". The bent-out edge sections of the film will display an uneven distribution of tensile strength values, so that they have to be cut off. The resultant loss in material can amount to in excess of 30% of the final width of the finished film.

A device for biaxially stretching films is disclosed in German Patent Specification No. 1,088,705. The disclosed gripping devices have their speed increased by spindles having a progressive pitch. Another device for biaxially stretching films is disclosed in U.S. Pat. No. 3,890,421, wherein each gripping device disclosed is moved independently from the others by a linear motor.

Such known devices for effecting a simultaneous biaxial stretching of film in the longitudinal and transverse directions have the disadvantage that as the degree of longitudinal stretching increases, there results an undesirable increase in the spacing between the gripping devices, as described above, and therefore such devices cannot be used when a high stretch degree of 1:5 to 1:10 in the longitudinal direction is required.

SUMMARY OF THE INVENTION

It is, therefore, an object of the present invention to overcome the aforementioned disadvantages of the prior art for fabricating biaxially stretched films, particularly films having a high degree of stretch in the longitudinal direction.

Another object of the present invention is to provide an apparatus in which the total amount of stretching of the area of the film can easily be altered or corrected.

A further object of the present invention is to provide an apparatus in which the number of mechanical operations heretofore conventionally required are reduced, and in which the means for maintaining the required film temperatures in the stretching steps are improved.

The apparatus according to the present invention, thus, comprises means for taking up the film, means for adjusting and maintaining the film at an elevated temperature, for example 50° C.–170° C., while being stretched, stretching rollers for effecting a partial longitudinal stretching of the film at said elevated temperature, the speed of the stretching rollers being infinitely variable and the last of which being driven at a higher speed than the first, a stretching device for effecting a simultaneous biaxial stretching of the film transversely and further longitudinally at said elevated temperature, said stretching device including gripping means for gripping the film at its edges, and said gripping means being operated in diverging relation and with increasing speed so as to effect a stretching of the film simultaneously in the longitudinal and transverse directions, and means for cooling the resultant biaxially stretched film. In a preferred embodiment, the apparatus presents the stretch-rollers for effecting partial longitudinal stretching of the film in an intake section of the stretching device.

The present invention is further generally characterized by an apparatus comprising rollers for taking up the film on the aforementioned stretching rollers, for effecting partial longitudinal film-stretching, and transporting rollers for conveying the film to the simultaneous biaxial stretching device, wherein at least most of the transporting rollers can be adjusted to the stretching temperature of the film by, for example, alternately heating and cooling, selectively, their cylindrical surfaces.

The apparatus according to the invention is preferably arranged inside a housing surrounding the stretching rollers for effecting partial longitudinal film-stretching and the stretching device for the simultaneous biaxial film-stretching, the vacant space inside the housing being heated to about the temperature at which the film is stretched.

In the apparatus according to the invention, which includes the stretching rollers for effecting a partial longitudinal pre-stretching of the film, the gripping means of the device for effecting the simultaneous biaxial film-stretching can be operated by a spindle having a progressive pitch by which the speed of the gripping means is increased at a constant ratio of, for example, preferably 1:2 in the longitudinal direction along their diverging paths, or they can be operated by linear motors with increasing speed.

The method of fabricating the film according to the present invention comprises the steps of compressing the thermoplastic material of which the film is constituted into an elongate film, continually advancing the film in the longitudinal direction, partially pre-stretching the film in the longitudinal direction while advancing it, and further stretching successive regions of the film simultaneously biaxially both in the longitudinal direction and in a direction transverse to the longitudinal direction such that any given point on the film in any given region that the film is being biaxially stretched is expanded simultaneously biaxially both in the longitudinal and transverse directions.

BRIEF DESCRIPTION OF THE DRAWINGS

Other objects and advantages of the present invention will become apparent from the following description of the preferred embodiment taken in conjunction with the accompanying drawings in which:

FIG. 3 is a plan view of the apparatus according to FIG. 2.

DETAILED DESCRIPTION OF THE INVENTION

Figure 1:
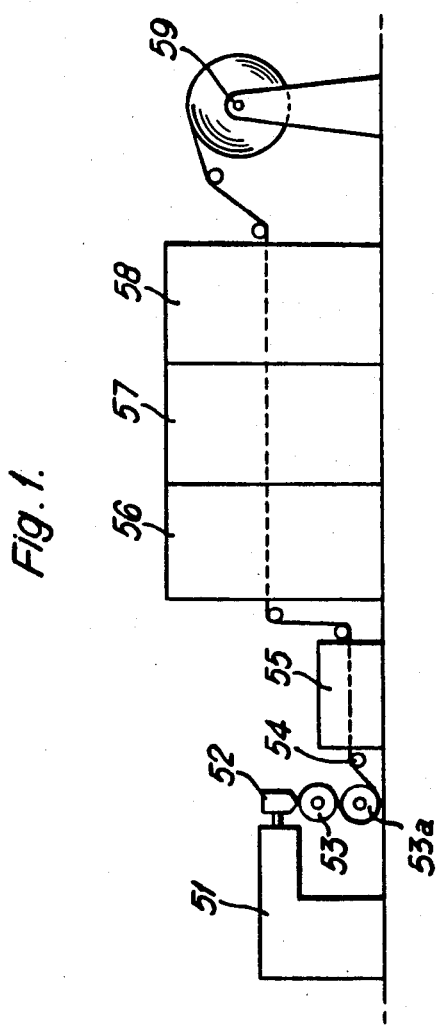
FIG. 1 illustrates schematically an apparatus according to the present invention.

In FIG. 1, a thermoplastic material is melted in an extruder 51 and extruded through a wide-split nozzle 52 onto a cooling cylinder 53, with which further cooling cylinders are associated in series. After leaving the last cooling cylinder, for example, cylinder 53a, the resultant thermoplastic film 54 has a temperature which is considerably below the thermoelastic or crystalline melting temperature of the thermoplastic material that is required for enabling the film 54 to be stretched without tearing.

After passing several conventional auxiliary devices and pre-heating zones (not shown) the film reaches a longitudinal film stretching device 55, which includes rollers (not shown in detail) which can rotate or be driven individually at infinitely variable speeds.

The longitudinal film-stretching device 55 consists of, for example, ten driven rollers having infinitely variable speeds, and which are distributed in three zones. In the first zone the rollers are heated to, in turn, heat the film 54 to a temperature at which the film can be stretched, for example, in the range of 50° C.–170° C. The rollers of the second zone, the stretching zone proper, are heated to the film-stretching temperature by means of alternately heating or cooling their surfaces. The rollers of the third zone in turn can be cooled, but are preferably maintained at the film-stretching temperature.

As the film 54 advances further, it proceeds, preferably substantially at the same film-stretching temperature, along appropriate auxiliary devices (not shown) and, immediately after leaving the longitudinal film-stretching device 55, it is moved to a device for effecting simultaneous biaxial film-stretching, longitudinally and transversely, the device comprising an intake section 56, in the form of a pre-heating zone (preferably maintained at the same temperature that the zone 55 is maintained at), a simultaneous biaxial film-stretching zone 57, and a tempering-and-fixing zone 58. In the simultaneous biaxial film-stretching device 56, 57, 58, the thermoplastic film 54 is gripped at its edges by conventional gripping and guiding devices (not shown), designated herein as "gripping means". The film is drawn through the pre-heating zone 56 in which the film is maintained with exactitude at the required temperature for enabling it to be stretched without tearing.

In the zone 57 for effecting simultaneous biaxial film-stretching, the gripping means simultaneously draw (pull) the thermoplastic film apart, both longitudinally and transversely, which results in the film being stretched correspondingly longitudinally and transversely. The biaxial stretching of the film is effected such that any given point on the film in any given region the film is being biaxially stretched is expanded simultaneously biaxially both in the longitudinal and transverse directions.

As will be clarified below, guiding and driving of the gripping means in diverging relation and with increasing speed can be effected by spindles rotating at constant speed. The pitch of these spindles increases progressively. The angle between the paths of the two groups of gripping means may be changed if necessary. It is also possible, however, to drive the gripping means by linear motors, or other conventional driving means, which are arranged according to the longitudinal and transverse stretch ratios required. The use of linear motors is permissible because after the film is stretched in the longitudinal direction by the appropriate rollers, the stretching forces created by the biaxial film-stretching device and the increased distances between the gripping means are reduced.

The simultaneous biaxial film-stretching zone proper 57 is located without a gap immediately upstream of the tempering-and-fixing zone 58, which for certain thermoplastic materials is necessary to enable the film to be heated slightly while gripped so that the film cross-section can be equalized and made uniform.

At the end of the complete apparatus for the simultaneous biaxial film-stretching, a cooling zone (not shown) is arranged for the purpose of cooling the thermoplastic film 54 to a temperature below the thermoelastic temperature range in order to freeze or make permanent the molecular orientations created in the thermoplastic film. On leaving the simultaneous biaxial film-stretching apparatus, the thermoplastic film 54 is advanced to a winding station 59 and wound onto a take-up roller.

For purposes herein, there is a distinction between the "thermoplastic" temperature range and the "thermoelastic" temperature range. Depending on the type of material, each film has associated with it a particular "thermoelastic" temperature range and a particular "thermoplastic" temperature range. The "biaxial" stretching is conducted in the "thermoelastic" temperature range, whereas equalization of the film cross-section is conducted at approximately 10° C.–20° C. above the maximum "thermoelastic" temperature of the film, near or in the "thermoplastic" range. The concept of a "stretched film" implies that the stretched film tends to contract at "thermoelastic" or higher temperatures. Films which are equalized in the above mentioned way, after cooled to temperatures below the minimum "thermoelastic" temperature, are considered tempered or thermofixed.

As an alternative to the extruder described earlier, which has a wide-slit nozzle 52 and cooling cylinders 53, 53a connected thereto in series, a heating device can be connected upstream of the rollers for effecting longitudinal film-stretching, which heating device is used to heat an already pre-fabricated thermoplastic web or strip to the temperature required for stretching.

In special cases it may be advantageous to substitute for the extruder a calender for fabricating the starting film.

The advantage of the apparatus according to the present invention consists in sub-dividing the total or overall amount of longitudinal stretching of a biaxially stretched film in such a way that the amount of final longitudinal film-stretching effected in the simultaneous biaxial film-stretching device remains constant, but the amount of pre-stretching in the longitudinal film-stretching assembly can selectively be varied. The spindles of the simultaneous biaxial film-stretching device for operating the gripping means can have, for example, a very low and constant progressive pitch, as a result of which the speed of the gripping means is increased only in a ratio of e.g. 1:2 in the longitudinal direction.

By using the apparatus consisting of the first and the second film-stretching devices, not only can small changes by pre-stretching in the longitudinal direction be achieved by variation of the longitudinal pre-stretching rollers (as may be advantageous in order to compensate for fluctuations or differences in the conditions of the process or the material), but also large differences in the amount of longitudinal stretching can be achieved, for example, from between about 1:2 and about 1:11, as may be necessary when replacing one material with another, the amount of final longitudinal stretching in the biaxial device, however, always remaining constant.

Figure 2:
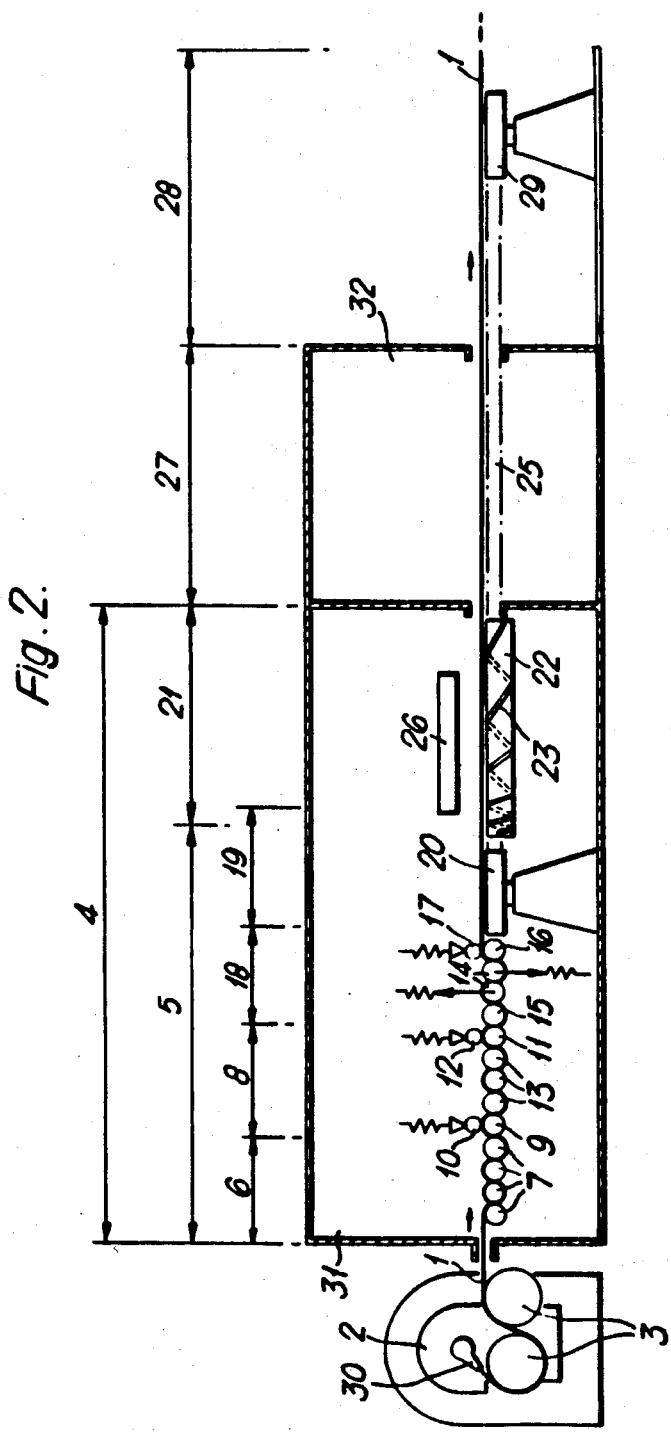
FIG. 2 illustrates schematically a preferred apparatus in greater detail.

In FIGS. 2 and 3, an apparatus is illustrated in which the stretching rollers for effecting partial longitudinal film-stretching are arranged in the intake section of the simultaneous biaxial film-stretching device, and can be operated as described above. In this regard, a film 1 is extruded from an extruder 2 via a wide-slit nozzle 30 onto a cooling cylinder 3a, and from the latter it is passed on to a further cooling cylinder 3. Further cooling cylinders of this type may also be provided.

The cooling cylinders 3, 3a cause the film to be cooled to just below the stretching temperature, i.e. for polypropylene about 140° C. At this temperature, the film advances into the simultaneous biaxial film-stretching device 4, comprising an intake section 5 and a simultaneous biaxial film-stretching zone 21.

The intake section 5 comprises a temperature equalization zone 6, in which rollers 7 adjust the film to the required stretching temperature, which lies approximately between 140° and 160° C. Subsequently, in the longitudinal film-stretching zone 8 between the first film-stretching roller 9 and the second film-stretching roller 11 longitudinal film-stretching takes place, which may be up to about 50% of the overall amount of longitudinal stretching of the finished film. Over the stretching rollers 9 and 11 counter-rollers 10 and 12 are mounted to press the film firmly against the film-stretching rollers 9 and 11. Between the film-stretching rollers 9 and 11 further film-stretching rollers 13 may be arranged to idle freely and which can be turned by the film running over them. In this case, the rollers 13 are provided with a trailing gear (not shown) to compensate for bearing friction and, thus, avoid any influence of the bearing friction on the amount of film-stretching.

The longitudinal stretching zone 8 is followed by a short film-guiding zone 18, in which in the example shown two equalizing rollers 14 are mounted behind a film-guiding roller 15. In the case of changes in the speeds of the film-stretching rollers 9 and 11, the equalizing rollers 14 can be moved out of their normal position in order to maintain the tension on the running film-web.

Via a film-delivering roller 16, co-operating with a counter-roller 17, the film reaches the take-up section 19 of the simultaneous biaxial film-stretching zone 21. This zone works with two spindles 22, which, corresponding to the desired transverse stretching of the film, are mounted in diverging relation with respect to each other.

The spindles 22 have spiral grooves 23 of increasing pitch, corresponding to the longitudinal film-stretching ratio desired in the simultaneous biaxial film-stretching zone. In the simultaneous biaxial film-stretching zone 21, the film is gripped at its edges by conventional gripping means 24. The gripping means 24 include projections which run on a guiding track 25. They are partly conveyed on the track 25 by an endless chain (not shown) and partly accelerated independently of one another in their movement by the spiral groove 23 of the spindles 22, during which the distances between them and their relative speeds change progressively. The gripping means 24 run around a respective cam-acting return wheel 29 and, by conventional spring-biased cam-follower means (not shown), the grip edges of the film in the area of the take-up section 19.

At the return wheels 29, the gripping means 24 open and release the now stretched and cooled film, so that it can be wound up in a conventional manner (not shown).

The intake section 5 with the longitudinal film-stretching zone 6 and the simultaneous biaxial film-stretching zone 21 are jointly accomodated in a closed housing 31. The space inside the housing 31 is heated to about the film-stretching temperature (by means not shown). This prevents any outside or ambient influence on the temperature of the film. Advantageously, the space is already heated to this working or film-stretching temperature some time before the apparatus is put into operation. As a result, all parts of the apparatus present in said space assume the same temperature, thus improving the efficiency of the overall operation of the apparatus. The rollers arranged in the intake section 5 now need to transmit only slight differences in temperature to the film.

In addition to the rollers 7, the cylindrical surfaces of other rollers, e.g. the stretching rollers 9, 11, 13 and the guiding rollers 15, may be heated and cooled as desired. Thereby, and by the temperature in the space, the film is kept exactly at the stretching temperature. Furthermore, over and, if required, under the simultaneous film-stretching zone 21, a heating radiator 26 can be arranged. Alternatively, a device (not shown) for blowing hot or cool air over the entire film or over individual zones thereof can be so arranged.

In the apparatus, the simultaneous biaxial film-stretching zone 21 is followed by a thermofixing zone 27, in which by conventional means, the film is heated for cross-section equalization for a short period to a higher temperature, for polypropylene to about 180° C. for about 10 seconds. Advantageously, the thermofixing zone 27 is also located in a closed space 32. The thermofixing zone 27 is connected to and followed by a cooling zone 28, in which the film is cooled to room temperature, e.g. 20° C. so that it leaves the apparatus at about room temperature, at the return wheels 29, to be wound onto rollers in a conventional winding device (not shown).

The apparatus shown is suitable, for example, for stretching the film material which gets onto the first bank of rollers 7 at a thickness in a range of 0.3 to 3.0 mm and at a width of about 600 mm, depending on the stretching ratios prescribed and the stretching quality of the material. From such starting films of e.g. polypropylene, finished stretched films having thicknesses in a range from 6 to 60μ can be produced, the maximum surface of "bidirectional stretching ratio attainable being up to about 1:50. For these starting films having a width of 600 mm and a transverse stretching capacity in the simultaneous biaxial film-stretching zone of from 1 to 7, the width of the finished film can be about 4 m after cutting off the edges. In the apparatus, films with a balanced amount of stretching, in which the stretching ratio in each direction is substantially 1:7, can be made, e.g. stretched films in which the surface stretching ratio (the product of the longitudinal and transverse stretching ratios) is about 1:50.

In the apparatus the amount of partial longitudinal pre-stretching is preferably 25% to 50% of the total stretching in longitudinal direction. Therefore a finished film with a balanced amount of stretching of 1:7 in both directions is longitudinally pre-stretched with a ratio of 1:3.5 and thereafter simultaneously in longitudinal direction 1:2 and in transverse direction 1:7, or if e.g. spindles with a pitch of 1:3.5 are used the partial longitudinal pre-stretching can be 1:2. But. the stretching ratio and, thus, also the strength in longitudinal direction should preferably be greater than in transverse direction, for most functions the film is to have eventually. Already a small amount of partial longitudinal pre-stretching of about 1:1.2 can improve the simultaneous biaxial stretching. For finished films with a total longitudinal stretching ratio of up to 1:11, and a transverse stretching ratio of about 1:4.55, the amount of longitudinal stretching in the device for effecting simultaneous biaxial film-stretching given by the pitch of the spindles can be 1:2, and thus a partial longitudinal pre-stretching of about 1:5.5 should be used to have a total surface stretching ratio of about 1:50. As the speed of the rollers for longitudinal pre-stretching is infinitely variable, the exact amount of required maximum total surface stretching, depending on the stretching quality of the material and being about 1:50, is achieved by small alterations in the speed of the rollers. Also other biaxially stretched films with total longitudinal and transverse stretching ratios as a result of which the surface stretching ratio is about 1:50 can be made in this way.

Having thus set forth the nature of the present invention, it is recognized that variations and modifications thereto may be readily apparent. All such variations and modifications are deemed aspects of the present invention as claimed.

What is claimed is:

1. Apparatus for biaxially stretching a flat film of thermoplastic material, comprising:
    (a) roller means for continually advancing and thereafter taking up said flat film in a longitudinal direction;
    (b) means for adjusting and maintaining said flat film at the temperature at which it is to be stretched;
    (c) roller means having infinitely variable speeds for partially pre-stretching said flat film only in said longitudinal direction while advancing it, the speed of said pre-stretching roller means being such that the flat film can be pre-stretched in the longitudinal direction to 20–50% of the total stretching capacity of the flat film in the longitudinal direction, said advancing and pre-stretching roller means including means for alternatively heating and cooling the cylindrical surfaces of said roller means wherein all of said roller means can be heated to the temperature at which said flat film is being subsequently stretched;
    (d) roller means for guiding the flat film from the pre-stretching roller means;
    (e) equalizing roller means, mounted behind the film guiding roller means, for maintaining tension on the flat film while said flat film is running, said equalizing roller means being capable of moving out of their normal position if necessary to maintain said tension;
    (f) means, positioned to receive the longitudinally pre-stretched flat film from the equalizing roller means, for further stretching said flat film simultaneously biaxially both in the longitudinal direction and in a direction transverse to said longitudinal direction, while further advancing said flat film in said longitudinal direction;
    (g) means for gripping said flat film at its edges;
    (h) carrier means for moving said gripping means longitudinally while the flat film is being simultaneously biaxially stretched;
    (i) divergently positioned rotatable spindle means having spiral grooves therein of increasing pitch corresponding to the longitudinal film-stretching desired in the simultaneous biaxial stretching of said flat film, said gripping means being operatively associated with said spindle grooves so that, as said spindle means rotate, the gripping means are moved along by said spiral grooves, said gripping means being operable in diverging relation and with increasing speed so as to stretch successive regions of said flat film simultaneously in said longitudinal and said transverse direction, such that, at any given point in any region, said flat film is being biaxially stretched both in said longitudinal and transverse directions;

j a housing means for surrounding said pre-stretching roller means and said stretching means, said housing means having space inside heated to about the temperature at which said flat film is being stretched; and (k) means, arranged beyond the housing means, for cooling the flat film after it has been biaxially stretched.

2. Apparatus as claimed in claim 1, in which said spindle means have a progressive pitch by which the speed of said gripping means is increased to about 1:2 in said longitudinal direction.

* * * * *